June 8, 1926.

O. A. KNOPP 1,587,841

TESTING SYSTEM

Filed March 16, 1925    2 Sheets-Sheet 1

INVENTOR
Otto A. Knopp
BY John Flam
HIS ATTORNEY

June 8, 1926.

O. A. KNOPP

TESTING SYSTEM

Filed March 16, 1925

INVENTOR
Otto A. Knopp
BY
John Flam
HIS ATTORNEY

Patented June 8, 1926.

1,587,841

UNITED STATES PATENT OFFICE.

OTTO A. KNOPP, OF OAKLAND, CALIFORNIA.

TESTING SYSTEM.

Application filed March 16, 1925. Serial No. 16,030.

This invention relates to the testing of electrical measuring apparatus, such as instrument transformers, and indicating or integrating instruments, such as wattmeters or watthourmeters.

This application is a division in part of an application filed in my name, on May 1, 1922, Serial No. 557,800, and entitled: Instrument transformer.

It is one of the objects of my invention to make it possible to test or calibrate instruments and instrument transformers quickly and simply. In this aspect, my invention is in the nature of an improvement over the method and apparatus disclosed in my prior patent, numbered 1,372,821 of March 21, 1921, entitled Electric measuring and calibrating method.

It is another object of my invention to improve the degree of accuracy that can be attained on commercial tests.

My invention possesses many other advantages, and has other objects which may be made more easily apparent from a consideration of several embodiments of my invention. For this purpose I have shown several forms thereof in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
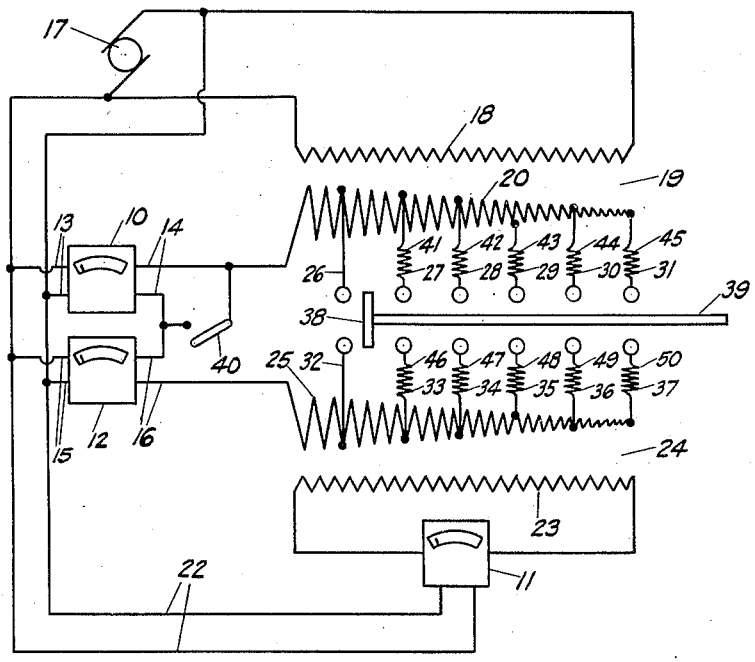
Figure 1 is a wiring diagram of a form of my invention applied to the calibration of wattmeters.

In Fig. 1, I show a standard wattmeter 10 with which another wattmeter 12 is to be compared for the purpose of calibration. Wattmeters of this type are provided with two sets or systems of coils, which sets are relatively movable with respect to each other. One set is the potential system, the other, the current system, and they react on each other by an amount that is a function of the energy represented by the current and voltage used. All this is well understood, and is merely detailed here for the purpose of coordinating the present scheme with such devices. For example, in Fig. 1, the leads 13 go to the potential coil system of instrument 10, while leads 14 go to the current coil system. Likewise, leads 15 connect to the potential coil system of instrument 12, and leads 16 to the current coil system.

The potential coil systems are all supplied with current from a common source, such as alternator 17. This alternator also supplies the primary coil 18 of a transformer 19. This transformer is the loading transformer for instruments 10 and 12, and the loading is accomplished by connecting at least a portion of secondary winding 20 in series with the current coil systems of both instruments 10 and 12. Since both instruments are subjected to the same potential and to the same current, a comparison of the indications of the two will show how great the error is for the meter 12 which is under test. By varying the number of active turns in the secondary coil 20, it is possible to vary the current flowing in the current coil systems of both instruments, while the potential coil systems are left unaltered. In this way, it would be possible by a direct comparison of the two meters, to obtain the calibration curve of meter 12.

However, if this method were followed, it would be necessary to have as many standard instruments 10 as there are ranges of instruments to be tested. When the scheme illustrated in Fig. 1 is used, it is necessary to obtain but one point by direct comparison; other points on the calibration curve can then be obtained by a simple calculation involving merely transformer ratios. Thus it is possible to use the same standard instrument 10 for testing a large variety of meters 12.

To effect this result, I provide an auxiliary meter 11, which has a potential coil system and a current coil system. The potential coil system may conveniently be energized from the same source by the aid of leads 22; the current coil system is energized from the secondary 23 of a multirange transformer 24, having a tapped primary 25 connected in series with the current coil systems of instruments 10 and 12. The coils 20 and 25 have respectively tap connections 26 to 31 inclusive, and tap connections 32 to 37 inclusive. The arrangement is such that the number of active turns of the secondary 20 and of primary 25 are simultaneously varied, as by the aid of a connection bar 38 bridging the tap points and operated by a movable handle 39. Furthermore the taps are so arranged that when bar 38 bridges a pair of them, the current in secondary coil 23 stays constant irrespective of the current flowing in the current coil systems of instruments 10 and 12. In other words, whatever effect transformer 19 has to change the current flow in the primary coil 25 is offset by the corresponding change in ratio in transformer 24. This effect is secured very readily by making the primary 25 substantially identical with the secondary 20, and these coils are so illustrated in Fig. 1.

It is now possible to explain in detail just how the method of testing may be employed. As an example, let us assume that instrument 12 to be calibrated has a comparatively large range, and that the standard instrument 11 has a small range. First of all, the bar 38 is moved to a position toward the right, to connect a pair of taps which cause coils 20 and 25 to have a comparatively large number of active turns in series. Under such circumstances, the current through meters 10 and 12 is comparatively low. The source 17 may now be so arranged as to make this current flow just sufficient to secure an indication on standard 10 which corresponds to the first calibration point. If the transformation ratio is such that there is $n$ times as much current in coil 20 as in coil 18, then due to the tap arrangement, the current $i$ in meter 11 is equal to say $\frac{I}{r}$, where I is the current in coils 20 and 25, and $r$ is the reduction ratio of transformer 24. This ratio, $\frac{I}{r}$ must be constant even when I and $r$ are varied by movement of handle 39.

The indication of meter 10 will be accurate and will be equal to E I cos $\theta$, where E is the voltage applied to the potential coil systems, and $\theta$ is the phase angle between E and I. The same reading should appear on meter 12, and whatever discrepancy there is will be noted for further use for the calibration curve.

Now let us assume that the next calibration point is such that the reading should be double; in other words, 2 E I cos. $\theta$ This effect can readily be obtained by shifting bar 38 to the left, so as to increase the ratio of transformation to 2 $n$ of transformer 19. In order to keep meter 11 indicating the same as before, the current 2 I must be reduced to the same value $i$; this value is however equal to $\frac{2I}{P}$, where P is the new ratio of transformer. But by a prior equation, $i$ is also equal to $\frac{I}{r}$, therefore $$\frac{I}{r} = \frac{2I}{P};$$

and from this there results that P=2 $r$; in other words, the ratio of transformation of transformer 24 has been doubled. This means that the number of turns in primary 25 has been halved by moving bar 38. It is evident also by analogous reasoning, that if a third calibration point be desired, of say 3 E I cos. $\theta$, then the ratio of transformation of transformer 24 will be 3 $r$; and so on. In other words, succeeding points of calibration can be obtained by merely noting the position of bar 38, without reference to the standard 10, and multiplying the first reading by the ratio of the transformer 24. Therefore it is possible to cut out standard 10 after the first point of calibration is obtained, as by the aid of a switch 40 short-circuiting the current coil system of the standard instrument.

Of course the reading of auxiliary meter 11 must stay constant; and readings of the meter 12 are not taken until the auxiliary meter reading comes to the set constant value.

It is one of the essentials of this method that the power factor, cos. $\theta$, be kept constant for all ranges. To effect this result, I provide resistances 41 to 50 in the tap points of coils 20 and 25, which resistances are so proportioned that the total ohmic resistance of the active portion of the coils is proportional to the square of the number of active turns. The manner in which this relation may be obtained is clearly explained in my co-pending application; Serial No. 557,800, hereinbefore identified.

When these resistances are thus proportioned, the $I^2$ R loss in the circuit including the two windings 20 and 25 is a constant upon variations in the number of turns, since I varies inversely as the number of active turns, while R is so chosen that it varies directly as the square of the number of turns. There is thus no change in the supply circuit, which would affect the angular relation of the current flowing through the current coil systems of the instruments.

The calibration method is applicable of course to other types of instruments. For example in Fig. 2 there is illustrated a scheme for calibrating watthourmeters, such as instrument 51. The scheme of connections is similar to that already described, except that for greater convenience, a plug 52 is used for insertion between any two corresponding taps, such as 53 and 54. Furthermore, a rotating standard 55 is used in place of the indicating meter 11 of Fig. 1. A standard 56 is used for the first point of comparison. A double pole switch 57 serves to connect the system to any suitable alternating current source. In series with primary 18 is a steady load, such as a lamp load 58, which may be used by the tester to light a dark space.

The first calibration point is obtained by plugging a pair of taps near the right hand end of coils 20 and 25; then the switch 57 is closed until the indication on meter 56 is that desired for the first point. The indication on rotating standard 55 is also noted. For succeeding points, meter 56 is de-energized by the aid of switch 40, rotating standard 55 is set to zero again, plug 52 is moved to the left, and the ratio of transformer 24 is noted. Switch 57 may then be closed and kept closed until meter 55 reads the same as before. From the transformation ratio, the new point of calibration is obtained. The process may now be repeated for succeeding tap points.

Figure 3:
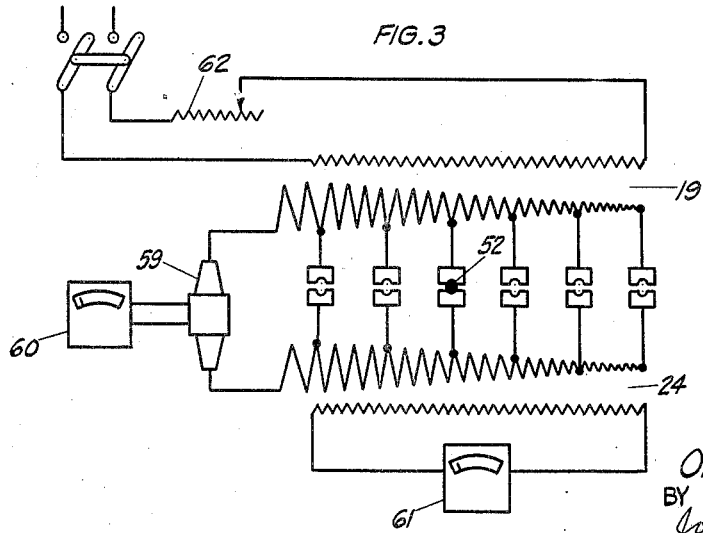
Fig. 3 is a wiring diagram illustrating an application of my invention to the calibration of instrument current transformers.

The same system can also be used for calibrating instrument current transformers, such as transformer 59 of Fig. 3. In this figure, the plug 52 is inserted in such a place as will make transformer 24 have the same nominal ratio as the transformer 59 under test. The standard ammeters 60 and 61 are of the same capacity and were prior to this test, calibrated in series to make them read alike for the same current flow. It is evident that if the ratio error of transformer 24 is negligible, as is quite easy to secure, then the two readings of instruments 60 and 61 can be compared to find the error in the ratio of transformer 59. In other words, if the instruments read alike, the ratio is correct; otherwise there is a plus or minus error; the difference in the readings giving the ratio error of transformer 59. By the aid of the variable resistance 62, the loading current can be varied from a small value to the full load value.

Instead of using ammeters 60 and 61, other devices can be used for comparing the ratios of the transformers 59 and 24, as for example a pair of wattmeters of equal capacity, the potential coils of which are energized from a common source; or else the secondaries of transformers 59 and 24 can be connected in series to affect a common detector showing the difference between the two currents.

Figure 2:
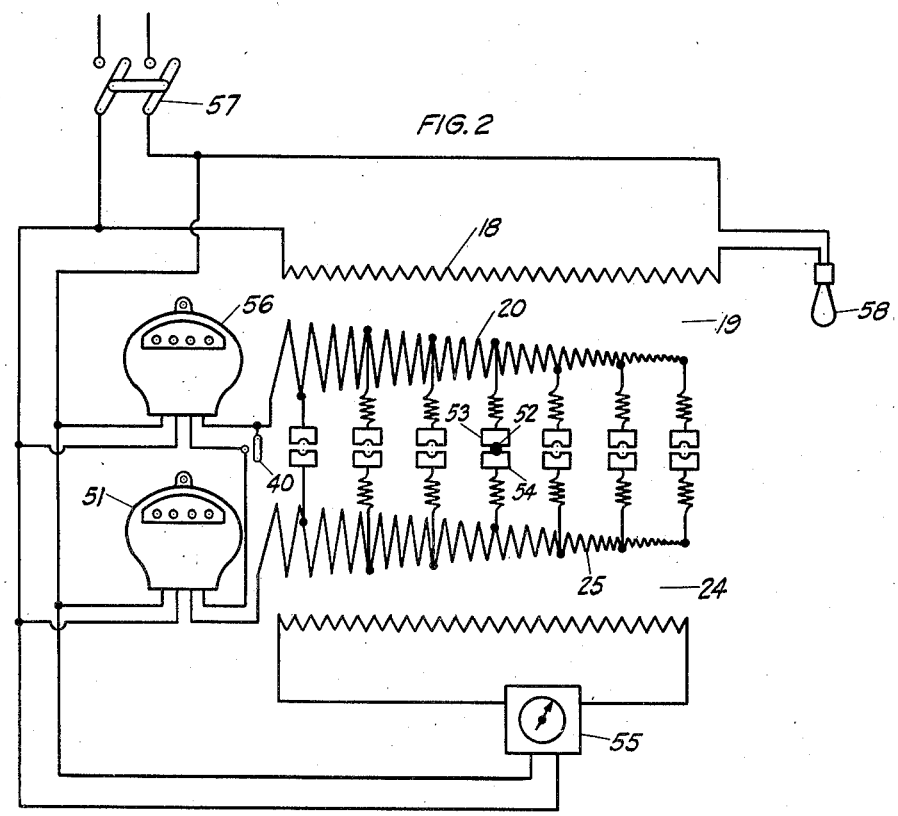
Fig. 2 is a similar wiring diagram of another form of my invention as applied to the calibration of watthourmeters.

In Fig. 2, resistances such as 41 to 50 of Fig. 1 are also shown, and these serve purposes similar to that already referred to; such an arrangement broadly is claimed in the copending case 557,800. If considered desirable, similar resistances can also be inserted in the leads of the system shown in Fig. 3.

I claim:

1. In a system for testing electrical apparatus, a source of alternating current, a transformer supplied by the source, and having a tapped secondary arranged to supply current to the apparatus under test, another transformer having a tapped primary in series with the tapped secondary, and having also a secondary, a measuring instrument supplied by the latter secondary, and means for simultaneously varying the number of active turns in the tapped primary and in the tapped secondary, the taps being so arranged that the current flowing through the measuring instrument stays substantially constant independently of the variation in the current flowing in the apparatus tested.

2. In the system as claimed in claim 1, the addition of resistances in the taps of both the tapped coils of such proportion that the resistance of the active portions of these coils varies as the square of the number of active turns in the coils.

3. In a system for calibrating instruments indicating a function of current flow, a source of alternating current, means for varying the flow of current from the source to the instrument under test, a measuring device arranged to be operated in accordance with the flow of current through it, a transformer arranged to be fed from the source and to supply said device, and a common means for changing the transformer ratio and the current flow through the instrument under test, said ratio being changed in such manner that the current through the measuring device stays substantially constant irrespective of the change in current in the instrument under test.

4. In a system for calibrating instruments indicating a function of current flow, a source of alternating current, a transformer supplied by the source, and having a tapped secondary arranged to supply a variable current to the instrument under test, another transformer having a tapped primary in series with the tapped secondary, and having also a secondary, a measuring instrument supplied by the latter secondary, and means for simultaneously varying the number of active turns in the tapped primary and in the tapped secondary, the taps being so arranged that the current flowing through the measuring instrument stays substantially constant independently of the variation in the current flowing in the instrument.

5. In the system as claimed in claim 4, the addition of resistances in the taps of both the tapped coils of such proportion that the resistance of the active portions of these coils varies as the square of the number of active turns in the coils.

In witness whereof, I have hereunto set my hand.

OTTO A. KNOPP.